Jan. 19, 1932.  L. N. WEBER  1,841,931
PROTECTING AND CURING FRESHLY LAID CONCRETE
Filed Jan. 21, 1931  2 Sheets-Sheet 1
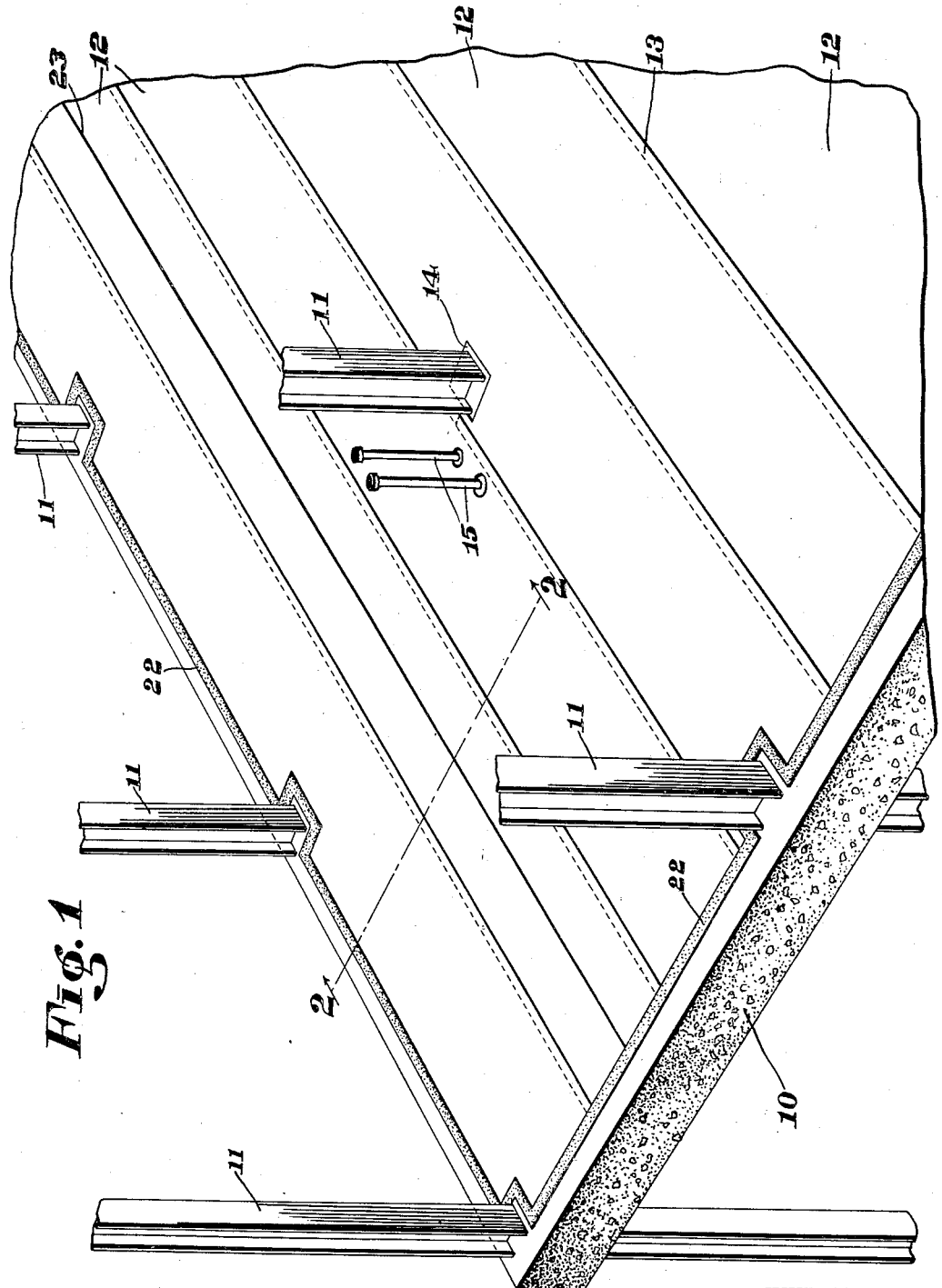
INVENTOR
Lester N. Weber
BY Rob't P. Hains
ATTORNEY Jan. 19, 1932. L. N. WEBER 1,841,931
PROTECTING AND CURING FRESHLY LAID CONCRETE
Filed Jan. 21, 1931 2 Sheets-Sheet 2
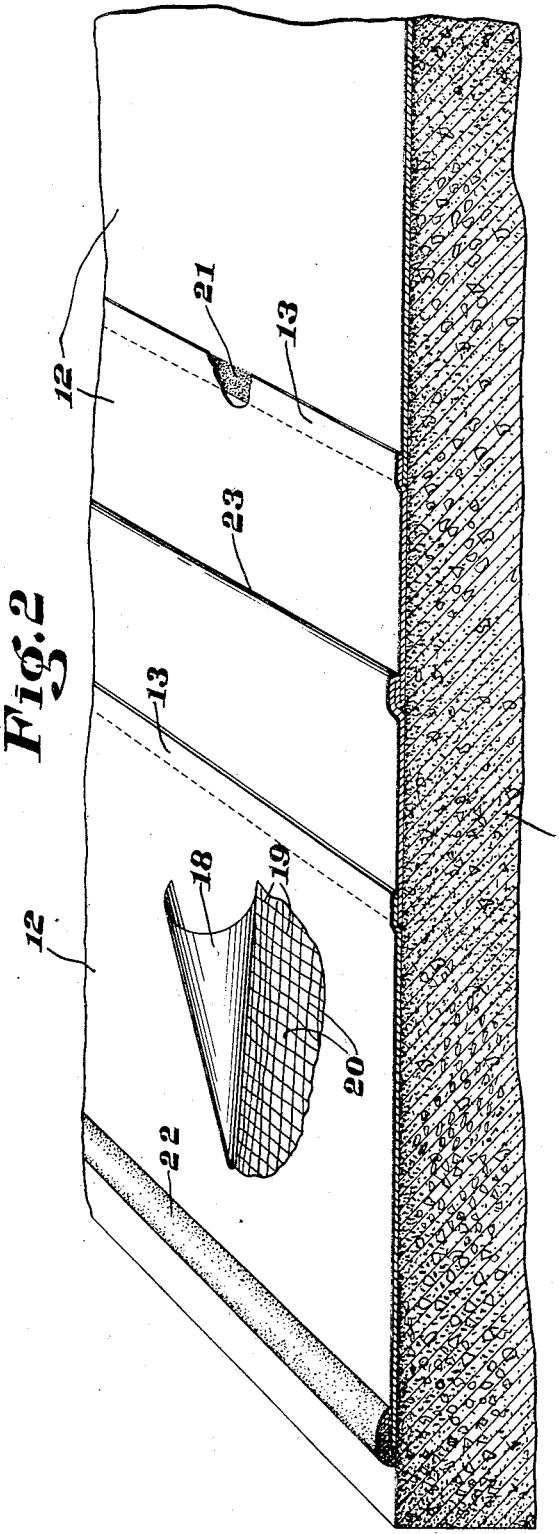
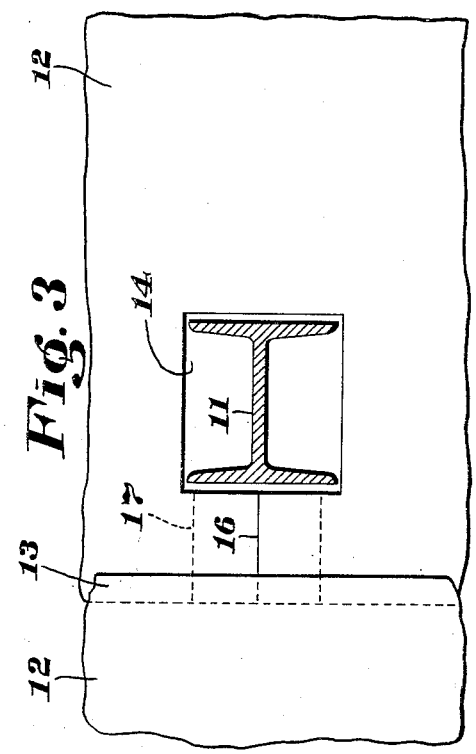
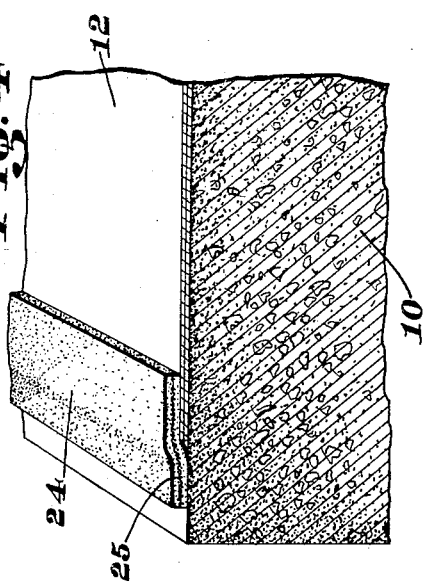
INVENTOR
Lester N. Weber
BY
Robt. O. Hains
ATTORNEY Patented Jan. 19, 1932

1,841,931

UNITED STATES PATENT OFFICE

LESTER N. WEBER, OF CHICAGO, ILLINOIS, ASSIGNOR TO AMERICAN REENFORCED PAPER COMPANY, OF ATTLEBORO, MASSACHUSETTS, A CORPORATION OF MASSACHUSETTS

PROTECTING AND CURING FRESHLY LAID CONCRETE

Application filed January 21, 1931. Serial No. 510,121.

This invention relates to a method of and cover for protecting and curing freshly laid concrete, and pertains more particularly to protecting and curing the concrete floors of buildings.

It is well known in the art of concrete construction that setting concrete requires a certain amount of moisture to insure proper curing of the concrete and thus produce a concrete of maximum strength.

Heretofore various methods of retarding the escape of moisture from concrete during the curing period have been used, and in some cases moisture has been supplied to the setting concrete by keeping its surface covered with earth, straw or other moisture holding material for a period of several weeks and wetting the covering material at frequent intervals. In other cases the freshly laid concrete has been covered with a bituminous coating to retard evaporation of the water in the setting concrete, and in still other cases the fresh concrete has been chemically treated to facilitate curing the same.

While these proposed methods of curing concrete may be employed more or less satisfactorily in connection with concrete under some conditions, they are not well adapted for use in protecting and curing concrete floors of a building where each floor is subjected to hard usage while the next floor overhead is being constructed, for under these conditions the floors should be thoroughly protected as well as cured.

In constructing buildings provided with a number of concrete floors one above the other, it is desirable that the floors be constructed one after the other without the loss of time on the part of the workmen, by waiting for the concrete of one floor to set before starting to construct the next floor. It is also important that each floor be thoroughly protected from defacement by the water and wet cement that drips from the concrete floor being constructed overhead, and from injury by the traffic over its surface and other causes.

The present invention therefore contemplates the method of protecting and curing concrete which consists in covering the floor or other area of freshly laid concrete with sheets of waterproof reenforced paper cut to conform to the configuration of the floor and to clear projections extending upwardly therefrom, and placed upon the concrete with their adjacent edges overlapped and firmly secured together to form a tough, durable, water-tight cover adapted to protect the floor from injury and defacement, and also adapted to retard the evaporation of the moisture within the concrete mixture during the concrete curing period.

The paper used in carrying out the present method is preferably a multiply paper reenforced both longitudinally and transversely and having the reenforcing fibers secured between two sheets of paper with a waterproof adhesive such as black asphaltum, and the adjacent sheets covering the concrete preferably have their edges firmly secured together with a water-tight joint to hold the sheets together and prevent moisture from escaping between the joints.

It is important that the entire paper covering sheet be firmly held down at its marginal edges to prevent displacement of the paper, also to prevent the circulation of wind underneath the paper which would cause evaporation of the moisture needed in the concrete for proper hydration of the cement during the curing period. A further feature of the present invention therefore resides in means for firmly securing the edges of the covering sheet down against the surface of the concrete.

When a covering sheet such as just described has its marginal edges secured to the concrete flooring it can not contract freely, and a substantial contraction of the paper may tend to tear the same or cause it to pull loose at the overlapping edges or at its outer marginal edge. In order to prevent this, another feature of the invention resides in a covering sheet provided with one or more folds or pleats to take care of the contraction and expansion of the paper while secured to the floor.

The various features of the invention will be further understood from the following description when read in connection with the accompanying drawings, wherein:—

Fig. 1 is a perspective view of a concrete floor of a building, the floor being covered with reenforced paper in accordance with the present invention.

Fig. 2 on an enlarged scale is a perspective sectional view taken on the line 2—2 of Fig. 1.

Fig. 3 is a top plan view showing the covering sheet of paper cut out and fitted around one of the columns of the building, and Fig. 4 is a sectional view showing modified means for securing the marginal edge portion of a covering sheet to the concrete floor.

The present method of protecting and curing concrete pertains more particularly, though not exclusively, to the concrete floors of a building and is therefore shown in connection with the concrete floor 10 of a building under construction and having the floor supporting columns 11. The side walls of the building are not shown as it is usual to complete the concrete floors before constructing the walls. While only one floor of the building is shown in the drawings it is to be understood that the columns 11 serve to support two or more floors of concrete disposed one above the other, and the usual forms, not shown, but employed in constructing a similar floor over-head may be supported from the floor 10, with the result that considerable water and wet cement is likely to drip from the floor over-head during its construction, onto the concrete floor 10. This will deface the surface of the floor 10 unless the floor is well protected.

While the concrete floor 10 is illustrated in the drawings as supported by the steel columns 11 the features of the present invention are equally well adapted for use in connection with monolithic constructions in which the floors are supported by columns formed of reenforced concrete, and certain features of the invention may be employed advantageously in protecting and curing concrete exposed to changing weather conditions, such as concrete roadways and the like.

In accordance with the present invention the upper face of the concrete area is covered with a waterproof protecting paper as soon as desired after the surface of the concrete has taken a sufficient set.

In accordance with the present invention the surface of the freshly laid concrete area is covered with waterproof reenforced strips or sheets of paper 12, and these sheets are preferably laid so that their edges overlap a distance of several inches as indicated by 13 to form a strong tight joint. The sheets of paper are cut out as indicated by 14 to clear the columns 11, pipes 15, or other projections extending upwardly from the concrete floor 10 as shown and are also cut to conform to the contour of the floor. When the cut-out 14 is formed some distance from the edge of a sheet of paper, as shown in Fig. 3 it is necessary to provide a cut or slit 16 extending inwardly from the edge of the sheet so that the sheet of paper may be laid about the column 11. If the slit 16 is only several inches long it will be sufficient to secure the edges adjacent the slit 16 to the overlapping edge 13 of the next sheet, but if the slit 16 extends inwardly some distance beyond the overlap it may be desirable to adhesively secure a patch formed of reenforced paper beneath the slit, as indicated by 17.

The sheet material for covering a concrete area preferably comprises an upper layer and a lower layer having a reenforcing material between and the three are held in assembled relation by a waterproof substance; and, as shown in the present instance, the upper and lower layers may be formed of paper while the intermediate layer may be of reenforcing filaments preferably, though not necessarily formed of unspun fibres, secured between the upper and lower layers by a waterproof material, such as asphaltum or the like. This construction is indicated in Fig. 2 where a portion of the upper layer is turned back to disclose the reenforce 19 and 20.

The overlapping edges of the sheets of material or paper 12 are preferably firmly secured together by a moisture-proof adhesive 21 which will not deteriorate in the presence of moisture and will serve also to prevent the water that falls upon the surface of the covering sheets of paper from finding its way between the overlapping sheets of paper onto the concrete floor, and at the same time will prevent the moisture of the concrete from escaping between the overlapping edges of the sheets. While several forms of waterproof adhesive may be employed excellent results have been obtained through the use of a waterproof adhesive formed by dissolving rubber in a solvent that dries quickly when exposed to the atmosphere, and good results have also been secured by using black asphaltum as the adhesive 21.

After the sheets of paper 12 have been laid and their overlapping edges secured together to form a water-tight covering sheet extending over the concrete area to be protected and cured, it is important to firmly secure the marginal edges of this entire protecting sheet so that the paper will not have its edges lifted or displaced by the wind or the traffic over the paper, for if the wind is allowed to lift the paper it will dry out the moisture of the concrete which is needed for the hydration of the cement during the curing period, and if the paper is displaced from the concrete surface by any cause the exposed portion of the concrete is likely to become soiled or stained.

While various means may be employed to hold the marginal edges of the covering sheet of paper in place excellent results may be obtained in accordance with the present invention by depositing along the marginal edges of the entire sheet a strip of plastic material 22 which may be formed of a mixture of sand and cement, plaster of Paris, or other plastic material which is capable of taking a rigid set and of gripping the face of the paper and the concrete as it sets. This strip 22 of adhesive material is preferably placed around the entire marginal edge of the covering sheet of paper to form a raised continuous bar having the configuration of the paper and the cut-out portions thereof, as shown in the drawings. The securing strip 22 is preferably placed partly upon the covering sheet of paper and partly upon the concrete surface, as will be apparent from Fig. 2.

It is found in practice that the sheet material tends to contract and expand as a result of changes in the weather conditions. It is therefore desirable to provide for this contraction and expansion so that the paper will not rupture or pull loose from its securing means 22 or the adhesive connections 21 under the contracting action of the paper. In accordance with the present invention the contraction and expansion of the paper is readily taken care of by providing folds or pleats 23 extending longitudinally of one or more of the sheets of paper 12, as shown in the drawings. Usually it is found unnecessary to provide pleats extending transversely of the sheet material to take care of the longitudinal contraction and expansion, but these pleats may be provided in either or both directions when desired.

In some cases it may be desirable to employ the modified construction shown in Fig. 4 of the drawing for anchoring the marginal edges of the covering sheet of paper to the concrete floor. In this figure the securing strip 24 comprises a central layer of woven fabric 25 which is imbedded in dry material such as plaster of Paris, but will set hard after being dampened with water. In employing the plastic strip 24 of Fig. 4 the same may be unrolled from a package or other source of supply, moistened and then applied along the edge of paper, as shown so as to firmly secure the paper to the concrete floor after the plastic material of the securing strip sets. While it is desirable that the plastic material 22 or 24 shall set sufficiently hard to firmly hold the paper in place, on the other hand this plastic material should not grip the concrete floor so firmly that difficulty will be experienced in chipping or otherwise removing the same from the concrete without injuring the face of the latter.

Reenforced waterproof paper constructed as herein shown and described is particularly well adapted to protect and cure concrete floors and roadways in accordance with the present invention, since it is capable of withstanding the severe wear caused by water, concrete and other building material falling upon the paper and being trampled into the paper by workmen walking upon this fallen material, and it is also capable of preventing this wet material from penetrating through the paper to injure or discolor the underlying concrete. Furthermore since the sheets of reenforced waterproof paper are firmly secured together along their longitudinal edges and the marginal edges of the composite covering sheet are firmly secured to the floor, the entire covering sheet is firmly held in place against accidental displacement and promotes curing of the concrete by retarding evaporation of the moisture therefrom.

What is claimed is:—

1. The method of protecting and curing concrete floors, which consists in covering a concrete floor with sheets of waterproof reenforced paper placed with their edges in overlapping relation to form a moisture-proof covering over the floor area to be cured, securing the overlapping edges of the sheets together with a moisture-proof adhesive, forming a pleat in one or more sheets to allow for contraction and expansion, and securing the marginal edges of the paper firmly to the concrete floor to retain the paper in place.

2. The method of protecting and curing concrete, which consists in covering a concrete floor or section by laying thereupon sheets of paper placed with their edges in overlapping relation to form a covering over the floor area to be cured, securing the overlapping edges of the sheets together, forming a pleat lengthwise of one of said sheets to allow for contraction and expansion, and securing the marginal edges of the paper firmly to the concrete to retain the paper in place.

3. A covering for protecting a floor of freshly laid concrete, comprising a waterproof reenforced sheet formed of an upper sheet of paper and a lower sheet of paper secured together with a waterproof adhesive and reenforced longitudinally with unspun fibres secured between the two sheets by the adhesive and provided with a pleat formed longitudinally of the sheet to facilitate its contraction and expansion.

4. A covering for protecting a floor of freshly laid concrete, formed of waterproof reenforced sheets adhesively secured together at their longitudinal edges and each sheet comprising an upper sheet of paper and a lower sheet of paper secured together with a waterproof adhesive and reenforced longitudinally with unspun fibres secured between the sheets of paper by the adhesive, and at least one of the reenforced waterproof sheets being provided with a pleat formed longitudinally thereof to facilitate contraction and expansion of the covering.

5. The method of protecting and curing concrete, which consists in covering a concrete area or section with sheet material, and forming in the sheet material one or more expansion pleats extending transversely to the direction of contraction and expansion of the sheet material.

6. The method of protecting and curing concrete, which consists in covering a concrete area or section with waterproof paper and forming in the paper one or more expansion pleats extending transversely to the direction of contraction and expansion of the paper.

7. The method of protecting and curing concrete, which consists in covering a concrete area or section with a sheet of waterproof material, forming in the sheet material one or more expansion pleats extending transversely to the direction of contraction and expansion of the material, and securing the marginal edges of the covering material to the concrete.

In testimony whereof, I have signed my name to this specification.

LESTER N. WEBER.